Patented Feb. 16, 1926.

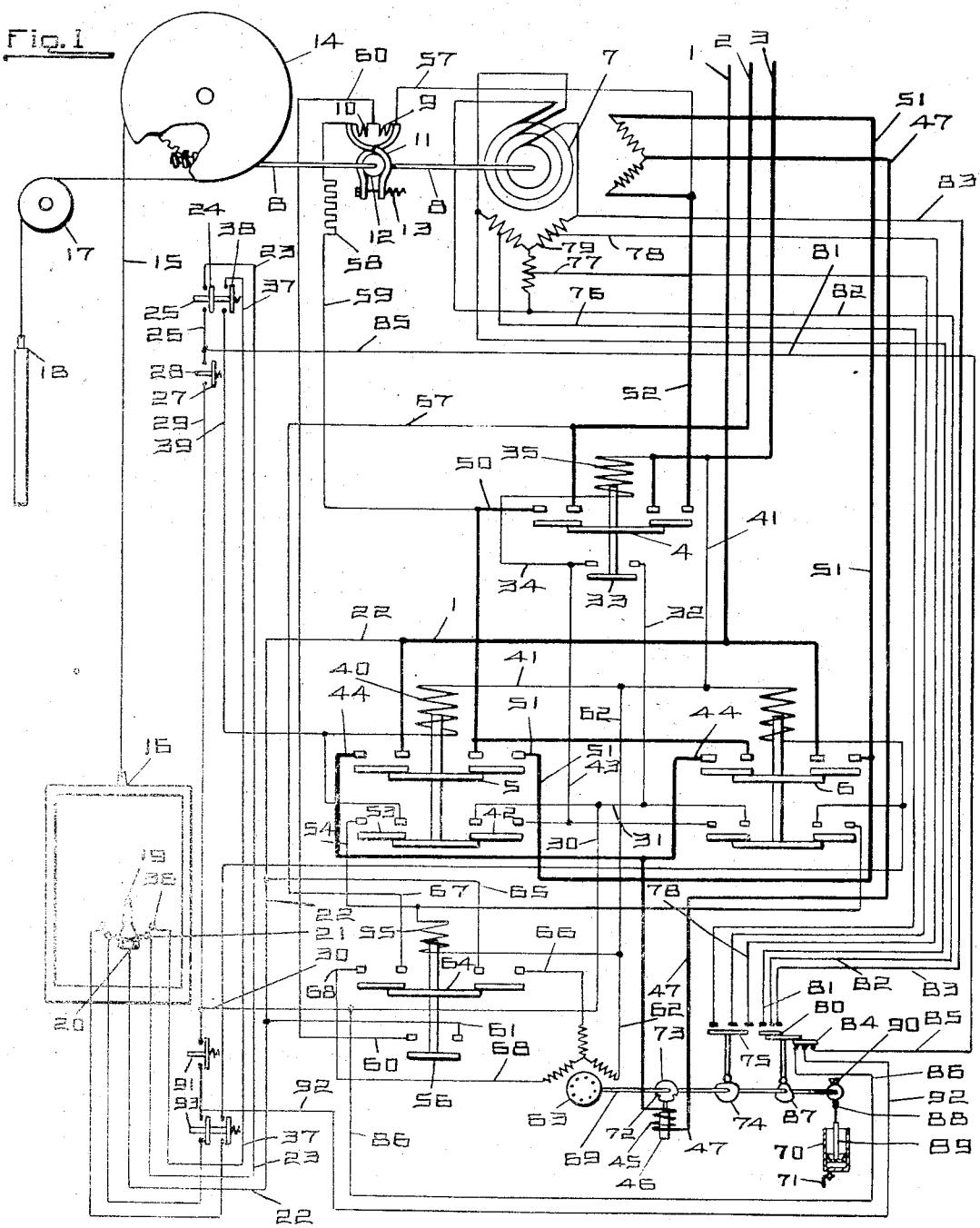

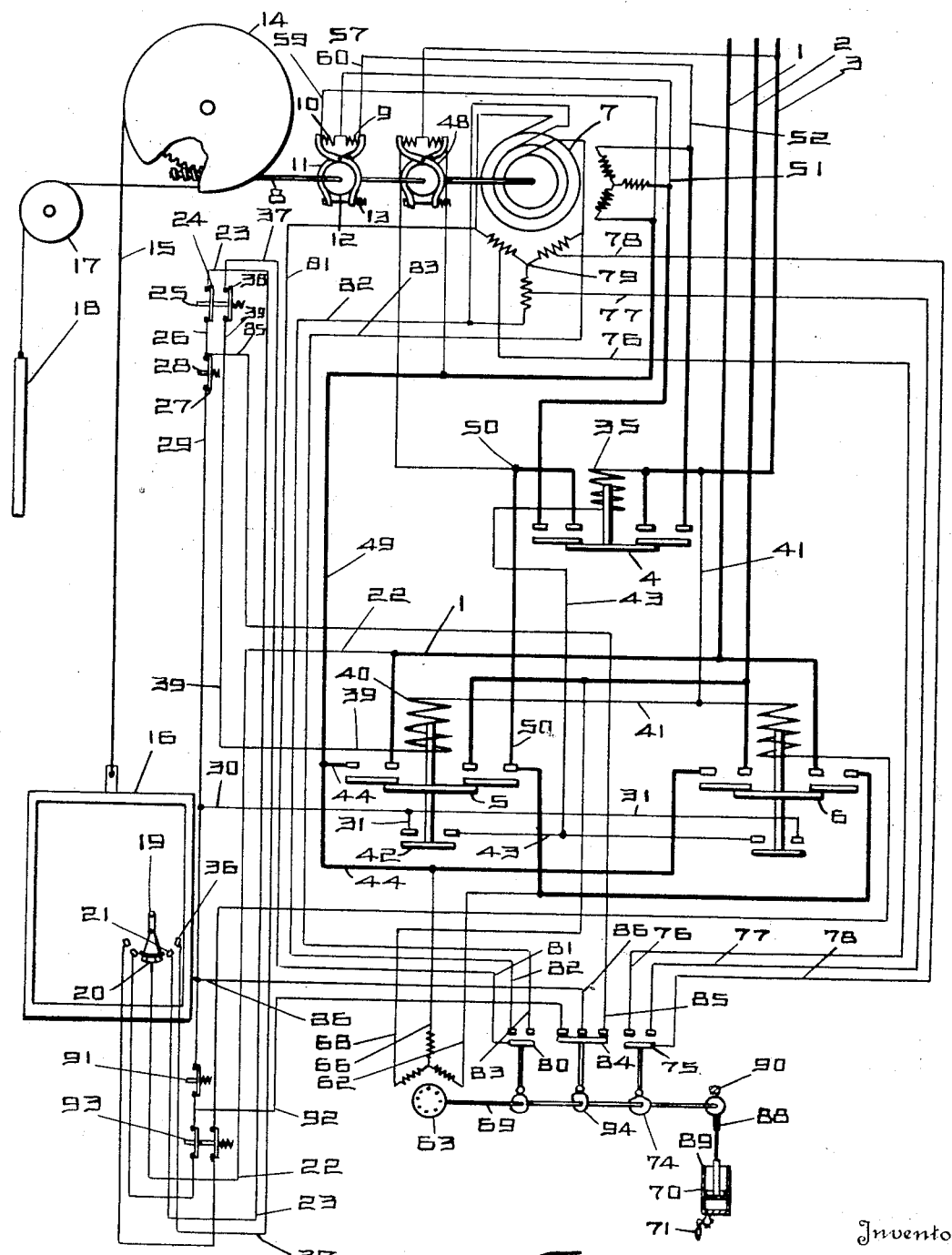

UNITED STATES PATENT OFFICE.

ERNEST B. THURSTON, OF TOLEDO, OHIO, ASSIGNOR TO THE HAUGHTON ELEVATOR & MACHINE CO., OF TOLEDO, OHIO, A CORPORATION OF OHIO.

ELEVATOR MOTOR CONTROLLER.

Application filed August 23, 1919. Serial No. 319,373.

*To all whom it may concern:*

Be it known that I, ERNEST B. THURSTON, a citizen of the United States of America, residing at Toledo, Lucas County, Ohio, have invented new and useful Elevator Motor Controllers, of which the following is a specification.

This invention relates to controlling, particularly electric motors in the stopping, or when bringing to a definite stopped position.

This invention has utility when incorporated in elevator installations particularly with alternating electric current motors for readily bringing the car to landing positions under various load conditions.

Referring to the drawings:

Fig. 1 is a wiring diagram of an embodiment of the invention in a three phase alternating electric current elevator installation;

Fig. 2 is a detail view of a limit switch;

Figure 4:
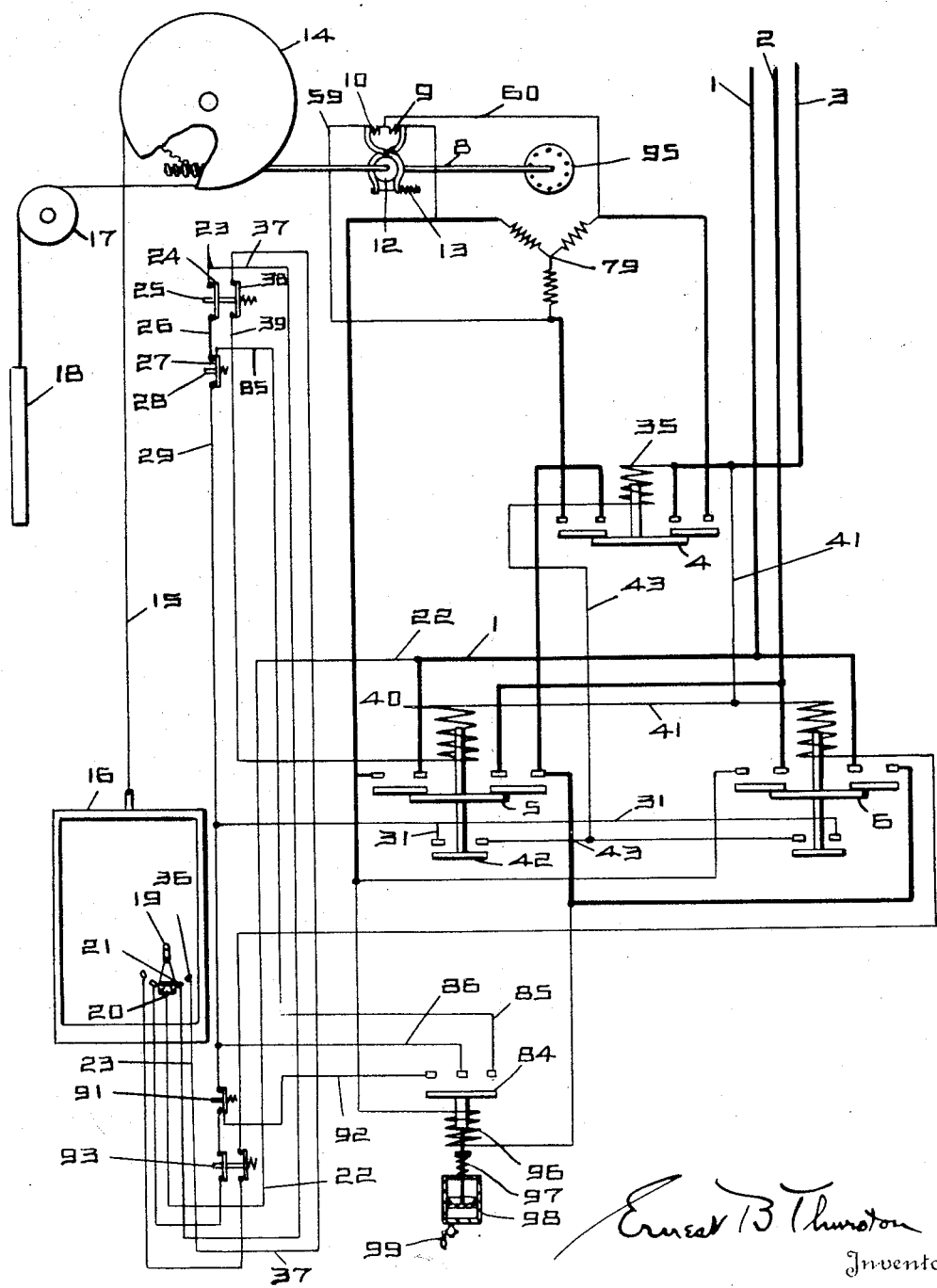

Fig. 3 is a wiring diagram of an alternating electric current elevator installation similar to the installation of Fig. 1, except that the double setting single brake feature of the showing of Fig. 1 is herein shown as two brakes; and Fig. 4 is a more simple wiring diagram of an electric elevator installation in which the motor is of the squirrel cage type and the control as influenced by the starting is from a solenoid instead of a torque motor, the torque motor being shown in connection with the diagrams of Figs. 1 and 3.

Supply lines 1, 2, 3, from an alternating electric current source may extend to main switch 4 and by up-direction switch 5 or down-direction switch 6 to operate motor 7 on shaft 8. Coils 9, 10, for brake 11 may serve to release such brake from drum 12 against the resistance of spring 13 so that this shaft 8 is free to operate drum 14 and thereby actuate hoisting cable 15 for elevator car 16. The other reach of this hoisting cable 15 passes from the drum 14 about idler 17 to support counter-weight 18. In the elevator 16 is a manually operable controller 19 which, if it be desirable to have the elevator car travel upward, may be shifted to have its contact not only cover a central pair of terminals 20, but in first position shifted to cover additionally terminal 21. From the central pair of terminals 20 extends line 22 to power supply line 1 thus forming one side of a circuit, which circuit may be completed through controller 19, contact 21, line 23, switch terminal 24 of upper main limit switch 25, thence by line 26 through terminal 27 of upper or auxiliary limit switch 28, thence by lines 29, 30, 31, 32, but not past interlock terminal 33 of the main switch 4. From this interlock terminal 33 line 34 extends to coil 35 of the main switch 4 and thence to the power supply line 3. The main switch 4 may not start the motor 7 until the controller 19 is moved to the further position determining the direction for the rotation of the motor 7 as by bringing the controller 19 on to the contact 36 which is connected by line 37 to upper main limit switch contact 38 of the switch 25, thence by line 39 to coil 40 of the up-direction switch 5. This energizes the switch 5 by the circuit therefrom being completed by lnie 41 to the main power supply line 3. The energizing of the switch 5 brings contact 42 to complete circuit by line 43 to line 34 to throw the switch 4 with the switch 5. The contact 33 is now closed so the switch 4 may be kept closed even if the switch 5 be opened.

With the main switch 4 and up-switch 5 thus energized and thrown, power from line 1 may pass by the up-direction switch 5 to line 44, to solenoid 45, thereby energizing and lifting core 46, thence by line 47, to the motor 7. Current from the power supply line 2 passes by the main switch 4 to line 50, thence by up-direction switch 5, line 51, to the motor 7. Current from the power supply line 3 passes by the main switch 4 and thence by line 52 to the motor 7 for up-direction rotation of the motor 7 in operating the shaft 8 to hoist the elevator 16 by line 15.

The brake 11 herein is shown as of the double setting type for gradually stopping the car. To effect control of this brake, there is provided on the up-direction switch 5 a contact 53 which will permit flow of the current from the line 39 to this terminal 53, thence by line 54 to energize solenoid 55 and thereby throw terminal 56. Upon energizing of the main switch 4, as permitted after the direction switch is in through contacts 33 or 42, there is current flow by line 57 through coils 9 and 10 in series, thence through non-inductive resistance 58, line 59, back to the main switch 4. Accordingly, when the brake 11 is fully released and the main switch 4 is closed, a cutting out of the direction switch by dropping the controller back off the terminal 36 effects a partial setting of the brake 11. The release of this brake 11 is accomplished at one step in starting by the throwing of the terminal 56 by coil 55 in the operation of the direction switch 5, for line 60 between coils 9, 10, is thereby connected through terminal 56 to line 61 which has its circuit completed to the supply line 1 by way of the line 22. Accordingly, at once the motor 7 starts in its elected direction of operation. The brake 11 is fully released.

From supply line 3 by line 41 and the line 62, current is supplied to one of the legs of squirrel cage torque motor 63. The energizing of the brake switch coil 55 throws switch 64 which permits flow of current by the line 22, a line 65 to line 66 supplying second leg of current to the torque motor 63, while the third leg is supplied from supply line 2 by line 67 to the switch 64, thence by line 68 to the torque motor 63. At once the up-direction switch 5 is energized and incidentally the switch 64. There is full current supply to the torque motor 63 on shaft 69.

The torque motor shaft 69 has connected thereto a dash pot 70 so that the time lag or rate of rotation of the shaft 69 as actuated by the torque motor 63 may be regulated by a valve 71 in the dash pot 70. Mounted on the torque motor shaft 69 adjacent the solenoid 45 to have the core 46 thrown to engage notch 72 thereof, is disc 73. After the shaft 69 is rotated a given distance, the coil 45 throws the core 46 into notch 72 of disc 73 and anchors the shaft 69 against further rotation. Also mounted on this shaft 69 adjacent the disc 73 is a cam 74 which in the first portion of the rotation of the shaft 69 throws the switch 75 after the determined lag in the rotation of the shaft 69 as an automatic device for permitting current flow by lines 76, 77, 78, to cut out a portion of the resistance 79 at the motor 7. The lag is determined by the adjustment of the dash-pot 70.

The notch 72 is now so positioned in the disk 73 that it may act to hold the shaft 69 after the switch 75 has been closed, and hold it so closed until the peak of the starting current for the motor 7 has lowered a little. The coil 45 is so proportioned that, at such drop of the starting current to the motor 7, due to the motor picking up speed, the core 46 will fall to release the shaft 69. Accordingly, there is now a time lag in the automatic cut-out of the resistance for starting the motor 7. This automatic cut-out by switch 75 occurs as the shaft 69 is locked by the core 46 and this switch 75 is still closed even after this locking occurs and the shaft 69 turns to the fully thrown position.

As automatically controlled by the motor 7 speeding up to permit core 46 to release the shaft 69, there occurs as the next stage of operation the final movement of the shaft 69 for throwing a switch 80, which through lines 81, 82, 83, cuts out the balance of the resistance 79 in completing the automatic cutting out of the resistance for the operation of the motor 7. This is a motor speed function control in completing the starting.

Simultaneously with the closing of the switch 80, switch 84 is opened, which, by way of lines 85, 86, cuts out any by-passing of the upper auxiliary limit switch 28. The switches 80, 84, are operated from a cam 87 on the shaft 69, approximately at the limit of movement of the shaft 69. The shaft 69 has in either direction but limited movement, herein shown as a swing short of 180° and determined by arm 88 moving from lower position of weight 89 to fixed stopping point 90.

If the operator of the car 16 moves the controller 19 off the point 36 while the car is ascending toward the upper landing, the up-direction switch 5 is opened, the brake coils 9 and 10, instead of being in parallel are placed in series and the motor 7 is stopped. This partial setting of the brake 11 gives a slight drag or hold action for sliding the car 16 to the landing. This coasting operation occurs notwithstanding the car 16 strikes the auxiliary switch 28 to open the contact 27. Cutting out of the terminal 42 by de-energizing the direction switch 5, also cuts out power to the torque motor 63. The shaft 69 accordingly is returned by the weight 89 to starting position opening switches 75 and 80, and closing switch 84 which permits current to by-pass the upper auxiliary switch 28 by way of the line 85, switch 84 and line 86 to maintain the main switch 4 energized and thus keep coils 9 and 11 energized in series.

However, if the operator of the car 16 holds the controller 19 so that it is on the contact 36 or in full thrown position for direction travel and the car 16 strikes the auxiliary limit stop 28 to open such stop, at once the main switch 4 is deenergized for there may not be by-passing by way of the switch 84 for such switch 84 is open due to the fact that the torque motor 63 is still energized because the direction switch 5 is closed and also the brake switch coil 55 is energized to hold switch 64 closed. This opening of the main switch 4 by the opening of the auxiliary stop switch 28 cuts out the power from two of the legs of the brake coils 9, 10, of the brake 11 thus giving a full setting of the brake for stopping the motor 7 as well as simultaneously cutting off the power supply to the motor 7. This application of full stopping action by the spring 13 on the brake drum 12 should insure stopping of the elevator 16 before it strikes the main stop limit switch 25.

In order that the operator of the car 16 may release the brake 11, it is essential that the controller 19 be moved centerward off the direction terminal 36 so that the direction switch 5 may be deenergized and thus open to release the torque motor 63. With the controller 19 in full off position, the torque motor arm 88 is back to initial or lower starting position to which it is drawn by the weight 89. However, the car 16 is in position to hold the auxiliary stop limit switch 28 open, but with the torque motor 63 released and the shaft 69 returned to starting position, the switch 84 is closed so that there may be by-pass of this open switch 28 by the lines 85, 86, and the car may be operated in the same direction to bring it up to the desired landing position short of full limit switch 25.

This device accordingly is a safety scheme insuring no overwinding in car operation even though the operator may be careless. The main limit stop switch 25 operated in its usual manner through its terminals 24 and 38 for cutting out not only the direction switch 5, but the main switch 4. A discussion for up-direction has been gone into in detail and similar control is effective for the down direction auxiliary limit switch 91 having by-pass line 92 and down main switch 93.

Besides modifying to a double brake the single partial brake release feature to permit more accurate landing with ease as shown in Fig. 1, Fig. 3 has additional cam 94 on the torque switch shaft 69 for operating the switch 84. Brake 48 sets only on opening of a direction switch, while brake 11 sets on opening of the main or a direction switch.

In Fig. 4 there is shown a squirrel cage motor 95 instead of slip ring type of motor as in the other diagrams of Fig. 3, but there is still incorporated the safety auxiliary stopping device. However, herein this is by means of a coil 96 energized as the direction switch is thrown in, to open the switch 84 against the action of spring 97 as retarded or cushioned by dash pot 98 adjusted by valve 99.

Off position is any one of three central positions when there is not direction switch control for car travel.

What is claimed and it is desired to secure by Letters Patent is:

1. An elevator, a way in which said elevator may travel, a power drive for the elevator, a brake, a controller for the elevator power drive embodying a plurality of contacts in one direction of controller operation, brake connections from the controller effective when the controller is in position for operating the drive for releasing the brake, a connection from the controller as shifted back, but when still on the same direction contact, for partially setting the brake, connections effective from the controller when the controller is shifted further to fully off said direction control for more fully setting the brake, and in a common direction in travel in said way and spaced from each other along said way, a pair of elevator stopping controlling means independently operable by the elevator for simultaneously rendering effective both settings of the brake when the controller is in on position.

2. An elevator, a step set brake therefor, main and auxiliary limit switches independently operable by the elevator in effecting independent settings of the brake, and a controller for releasing the brake between said settings.

3. A polyphase electric motor, means actuable thereby, a polyphase power supply for the motor, a step set brake for the means embodying windings providing a different number of phases in the different steps of said brake control, and a stop control device for the motor having main and auxiliary switches independently operable by the means to cut off the power supply from the motor and effect setting of the brake.

4. An electric motor, a controller therefor embodying two starting switches for the motor, said controller having one position at which position said controller effects closing of both starting switches, a first stopping switch for opening one of the starting switches, and connections from said controller effective as an independent operation from said first stopping switch for opening the other starting switch.

5. An electric motor, a controller therefor embodying two starting switches for the motor, said controller having one position at which position said controller effects closing of both starting switches, means actuable by the motor including a first stopping switch for opening one of the starting switches, and a second independently operable stopping switch for opening both starting switches.

6. An electric motor, a controller therefor embodying a main switch and a pair of direction switches, said controller having at a single position connections effecting closing of the main and a direction switch, means actuable by the motor, including a first stopping switch for opening the main switch, and a second stopping switch for opening a direction switch.

7. An electric motor, a controller therefor embodying a main switch and a pair of direction switches, said controller having at a single position connections effecting closing of the main and a direction switch, means actuable by the motor, including a first stopping switch for opening the main switch, and a second stopping switch for opening the main and a direction switch.

8. An elevator, an electric motor drive therefor, a controller for the motor having main and direction switches, said controller having at a single position connections effecting closing of the main and a direction switch, main and auxiliary limit switches independently operable for opening the controller switches.

9. An elevator, an alternating electric current motor, a controller for the motor having main and direction switches, said controller having at a single position connections effecting closing of the main and a direction switch, near each end of elevator travel main and auxiliary limit switches successively operable by the elevator in its travel, and connections for the auxiliary limit switch to open the main controller switch and for independent operation of the main limit switch to open the main controller switch and a direction switch.

10. An elevator, an alternating electric current motor for operating the elevator, a controller for the motor having off and on positions, a brake for the motor, said controller having a main switch provided with connections to the motor affecting the brake, a direction switch, there being connections from a single on position of the controller effective for operating both switches to closing position, a limit switch operable to affect the brake independently of operating the direction switch, and a second independently operable limit switch for opening the direction switch.

11. An elevator, a controller, automatic limit stop means, a brake connected to be affected by the stop means for holding the elevator, and a by pass for the stop means connected by shifting the controller to off position, said controller being then again shiftable to release the brake for effecting further operation of the elevator in the same direction.

12. An elevator, a motor therefor, main and direction switches for the motor, a controller for said switches, a first automatic limit stop means rendered inoperative by the controller in one position at which position the controller is effective in opening one of said switches independently of the other, and second automatic limit stop means operable independently of the position of the controller.

13. An elevator, a controller having starting connections, means energized by the controller for opening the starting connections, and a limit switch in parallel with the open starting connections, said controller operable to cut out the limit switch independently of returning the controller to off position.

14. An elevator, an electric motor therefor, a controller for the motor having starting connections including a switch, a limit stop in parallel with said starting connection switch, and means operable by the controller in starting to open the starting connection switch.

15. In a limit stop safety device for an elevator, a controller having off and on positions, a brake for the elevator, and means for bypassing the safety device embodying brake releasing connections effective when the elevator is stopped by the device, said connections for the brake from the controller requiring first shifting of the controller to off position before shifting to the same on position for thereby effecting further travel of the elevator in the same direction.

16. An elevator, a limit stop device therefor, a motor for the elevator, a controller for the motor having off and on positions, a brake for the elevator, and means for bypassing the stop device, when the elevator is stopped by the device, said means including brake releasing connections between the device and controller requiring first bringing the controller to off position before said on position may be effective.

17. An elevator, a limit stop device therefor, an electric motor for the elevator, a controller for the motor having off and on positions, main and direction switches closed by the controller, said device having connections for opening the main switch when the device is actuated by the car with the controller in on position as to a direction switch for effecting stopping of the car, but rendered inoperative when the controller is in position with the main switch closed and the direction switch open.

18. An elevator, an electric motor for the elevator, a brake for the elevator, a controller for the motor having off and on positions, main and direction switches closed by the controller at one position of the controller, a limit stop device for the elevator operable to open said switches with the controller in on position, and connections from said device ineffective as to the switches when the controller is in off position, thereby permitting release of the brake by shifting the controller to an on position.

19. An elevator, a limit stop device therefor, an electric motor for the elevator, a controller for the motor having off and on positions, main and direction switches closed by the controller, said device having connections ineffective as to the switches when the controller is off, and a switch permitting bypassing of the device for resetting the main switch only when the controller is first brought to off position.

20. An elevator, an electric motor for the elevator, a controller for the motor, a brake for the motor, said controller having a main switch provided with connections to the motor affecting the brake, a direction switch, said switches being operable to closed position from a single position of the controller, and a limit switch by-passed by shifting of the controller whereby the controller may release the brake, said limit switch being operable to affect the brake independently of opening the direction switch.

21. An elevator, an alternating electric current motor for the elevator, a controller for the motor, a brake for the motor, said controller having a main switch provided with connections to the motor affecting the brake, a direction switch, said switches being both operable to closed position from a single position of the controller, a limit switch by-passed by shifting the controller whereby the controller may release the brake, said limit switch operable to affect the brake independently of operating the direction switch, and a second independently operable limit switch for opening the direction switch.

22. An elevator, an electric motor for the elevator, a controller for the motor, a brake for the motor, said controller having a main switch provided with connections to the motor affecting the brake, a direction switch, a limit switch operable to affect the brake independently of opening the direction switch and connected to be operated by movement of the elevator into a predetermined position, and connections from the controller for bypassing said limit switch, whereby the controller may release the brake for operating the elevator in said limit switch controlled region of elevator travel.

In witness whereof I affix my signature.

ERNEST B. THURSTON.